US009541103B2

United States Patent
Sora

(10) Patent No.: US 9,541,103 B2
(45) Date of Patent: *Jan. 10, 2017

(54) POWER SOURCE APPARATUS AND HYBRID CONSTRUCTION MACHINE EQUIPPED WITH SAME

(75) Inventor: Toshio Sora, Hiroshima (JP)

(73) Assignee: KOBELCO CONSTRUCTION MACHINERY CO., LTD., Hiroshima-shi (JP)

( * ) Notice: Subject to any disclaimer, the term of this patent is extended or adjusted under 35 U.S.C. 154(b) by 485 days.

This patent is subject to a terminal disclaimer.

(21) Appl. No.: 14/000,065

(22) PCT Filed: Feb. 9, 2012

(86) PCT No.: PCT/JP2012/000851
§ 371 (c)(1),
(2), (4) Date: Aug. 16, 2013

(87) PCT Pub. No.: WO2012/111280
PCT Pub. Date: Aug. 23, 2012

(65) Prior Publication Data
US 2014/0000252 A1    Jan. 2, 2014

(30) Foreign Application Priority Data

Feb. 17, 2011 (JP) .................. 2011-032011

(51) Int. Cl.
*F15B 15/00* (2006.01)
*E02F 9/20* (2006.01)
(Continued)

(52) U.S. Cl.
CPC ............... *F15B 15/00* (2013.01); *B60K 6/485* (2013.01); *E02F 9/2066* (2013.01);
(Continued)

(58) Field of Classification Search
CPC ...... F16H 61/475; E02F 9/2075; E02F 9/2296; E02F 9/2246; E02F 9/2228; E02F 9/2235; B60W 10/08; B60L 1/003
(Continued)

(56) References Cited

U.S. PATENT DOCUMENTS 5,174,114 A     12/1992  Aoyagi
6,666,022 B1 *  12/2003  Yoshimatsu ............. B60K 6/46
                                                  60/413
(Continued)

FOREIGN PATENT DOCUMENTS

CN    101878145 A    11/2010
CN    101903627 A    12/2010
(Continued)

OTHER PUBLICATIONS

Extended European Search Report issued Aug. 26, 2015 in Patent Application No. 12747861.8.
(Continued)

*Primary Examiner* — F. Daniel Lopez
*Assistant Examiner* — Richard Drake
(74) *Attorney, Agent, or Firm* — Oblon, McClelland, Maier & Neustadt, L.L.P.

(57) ABSTRACT

A power source apparatus includes a controller that carries out horsepower control to determine a flow rate of a hydraulic pump in accordance with a discharge pressure of the hydraulic pump detected by a pump pressure determination sensor. In horsepower control, the controller determines the flow rate such that a maximum input setting for the hydraulic pump defined by the discharge pressure and the flow rate is greater than a maximum output of the engine when the discharge pressure is a first discharge pressure, gradually becomes smaller as the discharge pressure changes from the first discharge pressure towards a higher pressure, and
(Continued)

becomes smaller than the maximum output of the engine when the discharge pressure is a second discharge pressure.

5 Claims, 2 Drawing Sheets

(51) Int. Cl.
    *E02F 9/22*     (2006.01)
    *F02D 29/04*     (2006.01)
    *B60K 6/485*     (2007.10)

(52) U.S. Cl.
    CPC .......... *E02F 9/2075* (2013.01); *E02F 9/2228* (2013.01); *E02F 9/2235* (2013.01); *F02D 29/04* (2013.01); *Y02T 10/6226* (2013.01)

(58) Field of Classification Search
    USPC .............................................. 60/431; 180/165
    See application file for complete search history.

(56) References Cited

U.S. PATENT DOCUMENTS

| | | | | |
|---|---|---|---|---|
| 8,438,846 B2 * | 5/2013 | Ohtsukasa | ...... | B60W 30/18172 60/431 |
| 9,032,726 B2 * | 5/2015 | Sora | ...... | E02F 9/2235 60/431 |
| 2003/0226291 A1 | 12/2003 | Naruse et al. | | |
| 2009/0133951 A1 | 5/2009 | Schultz et al. | | |
| 2009/0238696 A1 | 9/2009 | Satake et al. | | |
| 2010/0170239 A1 * | 7/2010 | Sora | ...... | B60K 6/485 60/459 |
| 2010/0299032 A1 | 11/2010 | Roth | | |

FOREIGN PATENT DOCUMENTS

| | | |
|---|---|---|
| EP | 1 191 155 A1 | 3/2002 |
| EP | 2 204 504 A1 | 7/2010 |
| JP | 2004 150307 | 5/2004 |
| JP | 2005 83242 | 3/2005 |
| JP | 2005-188674 A | 7/2005 |
| JP | 2005 194978 | 7/2005 |
| JP | 2008 163669 | 7/2008 |
| JP | 2011 174468 | 9/2011 |

OTHER PUBLICATIONS

International Search Report Issued Mar. 6, 2012 in PCT/JP12/000851 Filed Feb. 9, 2012.

* cited by examiner

POWER SOURCE APPARATUS AND HYBRID CONSTRUCTION MACHINE EQUIPPED WITH SAME

TECHNICAL FIELD

The present invention relates to a power source apparatus for a hybrid construction machine which combines use of motive power of an engine and electrical power of an electric storage device.

BACKGROUND ART

The background art is described by taking a shovel machine as an example.

In a normal shovel which has only an engine as a power source, horsepower control is carried out to control a flow rate of a hydraulic pump in accordance with a load pressure of a hydraulic pump (discharge power of a hydraulic pump). The horsepower control is carried out in accordance with the characteristics shown in FIG. 3. More specifically, the characteristics shown in FIG. 3 are set in such a manner that the flow rate is a maximum at control starting pressure (the pressure division A in FIG. 3) and the flow rate is a minimum at maximum pressure (relief pressure).

In the characteristics shown in FIG. 3, the maximum input setting of the hydraulic pump is set to be no greater than the maximum output of the engine, in such a manner that the engine does not become overloaded. More specifically, the maximum input setting of the hydraulic pump is set so as to be smaller than the maximum output of the engine by a substantially constant value.

More specifically, with the characteristics shown in FIG. 3, the following relationship is established.

Maximum output of engine>Maximum input of hydraulic pump=Discharge pressure of hydraulic pump×flow rate (Note that the Efficiency and the Coefficient are Omitted Here)

Generally, a combination of flow rate control and the horsepower control described above is used to control the flow rate of the hydraulic pump. More specifically, the lower flow rate is selected, of the flow rates calculated respectively by flow rate control and horsepower control, and the selected flow rate is instructed to the regulator of the hydraulic pump. The flow rate control described above is a control system for controlling the flow rate of the hydraulic pump in accordance with the amount of operation of operating means which operates a hydraulic actuator (called "lever operation amount" below).

In the flow rate control described above, the flow rate is set to a standby flow rate (a flow rate which is determined by taking account of the system responsiveness at the start of operation) when the operating means is in a neutral state, whereas the flow rate is set to a maximum flow rate when the operating means is fully operated.

On the other hand, in the horsepower control described above, the flow rate is set to a maximum flow rate when at the control starting pressure, whereas the flow rate is set to a minimum flow rate when at the relief pressure.

Consequently, in the pressure division A described above, a flow rate for the hydraulic pump is instructed on the basis of flow rate control in accordance with the amount of operation of the operating means, and in the pressure range of the hydraulic pump exceeding this division A, a flow rate for the hydraulic pump is instructed on the basis of horsepower control.

On the other hand, the hybrid shovel includes a hydraulic pump which drives a hydraulic actuator, a generator-motor which can operate as an electric generator and as an electric motor, and an engine to which the hydraulic pump and the generator-motor are connected. In this hybrid shovel, an electric storage device is charged by operation of the generator-motor as an electric generator, and driving of the hydraulic pump is assisted by operation of the generator-motor as an electric motor, using electric power discharged from the electric storage device.

The flow rate characteristics of the hydraulic pump in the hybrid shovel are basically set to be the same as a normal shovel, in order to maintain the mechanical characteristics of the normal shovel.

However, the assistance provided by the generator-motor (electric storage device) as described above is added to the power of the engine in the hybrid shovel. Consequently, as shown in FIG. 4, the maximum output of the engine in the hybrid shovel is set to a value that is lower than the maximum output of the engine in a normal shovel, taking account of the assistance described above (normally, an average power; this applies to the following description as well).

More specifically, with the characteristics shown in FIG. 4, the following relationship is established.

Maximum output of engine<Maximum input of hydraulic pump

Moreover, with the characteristics shown in FIG. 4, the following relationship is also established.

(Maximum output of engine+Maximum assistance power)>Maximum input of hydraulic pump This hybrid shovel has the following two intrinsic problems. Firstly, when the amount of charge of the electric storage device has declined, the assistance capability described above declines, and when the remaining amount of charge of the electric storage device falls below a limit, the assistance capability is lost. Therefore, the engine becomes overloaded and there is a risk of stalling.

Secondly, with frequent high-level charging and discharging, severe deterioration of the electric storage device occurs.

As a countermeasure for problems of this kind, technology has been proposed for limiting the maximum input of the hydraulic pump in accordance with the amount of charge in the electric storage device (see, for example, Patent Document 1).

The control described in Patent Document 1 is control based on a supportive approach in that the progress of discharging and the occurrence of sudden charging and discharging are suppressed by limiting the maximum input of the hydraulic pump in accordance with decline in the amount of charge in the electric storage device. Consequently, during normal work where the wear (discharging) of the electric storage device is gradual, the control described in Patent Document 1 is effective.

However, under high-load pressure conditions (and in particular, relief pressure conditions) such as a warm-up operation immediately after starting up the engine in cold conditions, or rock excavation work, if the hydraulic pump is operated continuously, in other words, if the hydraulic pump is continuously operated at full power, then the electric storage device wears (discharges) rapidly at a high level. In circumstances such as these, even if the control described in Patent Document 1 is implemented, wear of the electric storage device cannot be suppressed and the assistance capability of the electric storage device declines suddenly. Consequently, during subsequent normal work, the assistance capability becomes insufficient or it becomes impossible to provide assistance, thus creating a hindrance to work tasks.

Patent Document 1: Japanese Unexamined Patent Publication No. 2005-83242

SUMMARY OF THE INVENTION

It is an object of the present invention to provide a power source apparatus for a hybrid construction machine whereby it is possible to suppress wear of a electric storage device during continuous operation of a hydraulic pump under high-load pressure conditions, and to ensure assistance capability during subsequent normal work.

In order to resolve the problems described above, the present invention provides a power source apparatus for a hydraulic actuator, including: a hydraulic pump which drives the hydraulic actuator; a generator-motor capable of operating as an electric generator and an electric motor; an engine to which the hydraulic pump and the generator-motor are connected; an electric storage device which is charged by operation of the generator-motor as an electric generator, and which is capable of supplying charged electric power to the generator-motor in order to cause the generator-motor to operate as an electric motor so as to assist driving of the hydraulic pump; a pump pressure detector which detects a discharge pressure of the hydraulic pump as a load pressure of the hydraulic pump; and a controller which implements horsepower control for determining a flow rate for the hydraulic pump on the basis of flow rate-pressure characteristics that define a maximum input setting for the hydraulic pump by the discharge pressure of the hydraulic pump and the flow rate of the hydraulic pump, and the discharge pressure detected by the pump pressure detector, wherein the flow rate-pressure characteristics are set in such a manner that the maximum input setting for the hydraulic pump is greater than the maximum output of the engine when the discharge pressure is at a predetermined reference pressure, gradually becomes smaller as the discharge pressure changes from the reference pressure towards higher pressure, and becomes smaller than the maximum output of the engine when the discharge pressure is at maximum pressure.

Furthermore, the present invention provides a hybrid construction machine which includes a hydraulic actuator, and the power source apparatus which supplies power to the hydraulic actuator.

According to the present invention, it is possible to suppress wear of a electric storage device during continuous operation of a hydraulic pump under high-load pressure conditions, and to ensure assistance capability during subsequent normal work.

MODES FOR CARRYING OUT THE INVENTION

Below, an embodiment of the present invention is described with reference to the accompanying drawings. The embodiment described below is one example of a concrete embodiment of the present invention, and is not intended to limit the technical scope of the present invention.

Figure 1:
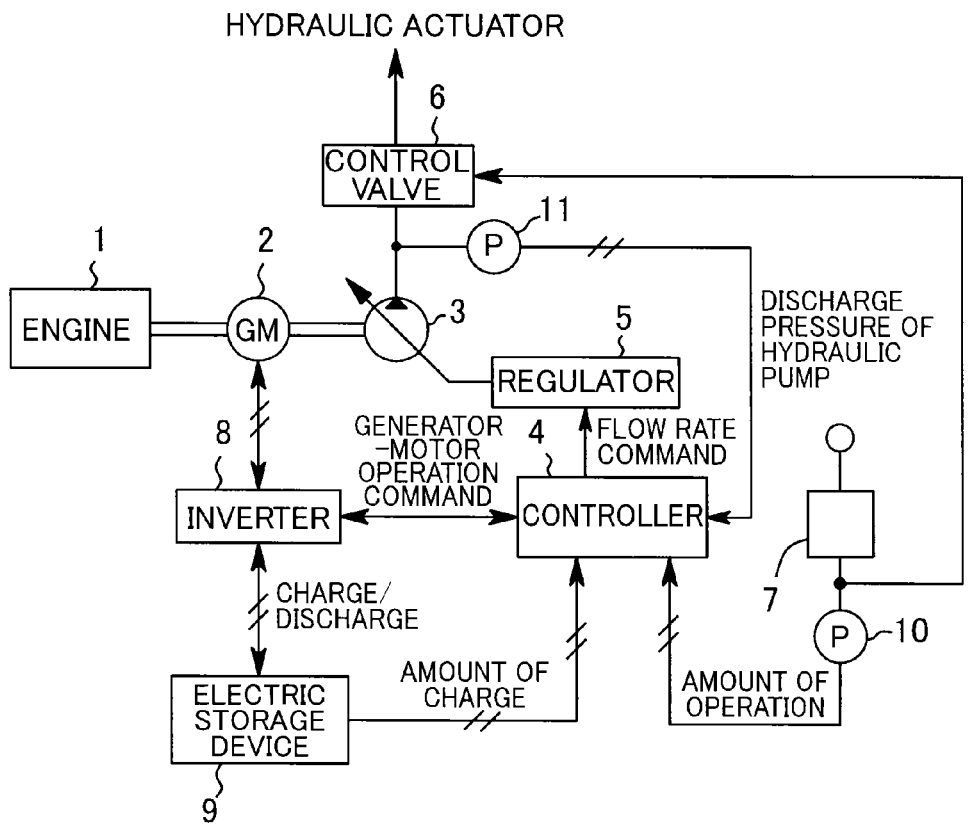
FIG. 1 is a block diagram showing a general composition of a power source apparatus relating to an embodiment of the present invention.
Figure 2:
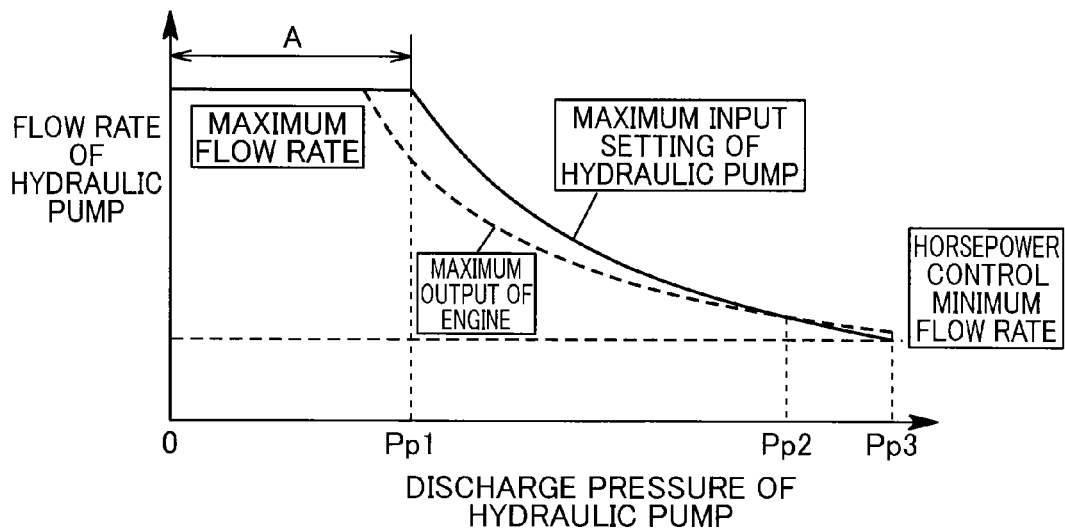
FIG. 2 is a graph showing a relationship between a discharge pressure of a hydraulic pump and a flow rate of the hydraulic pump.
Figure 3:
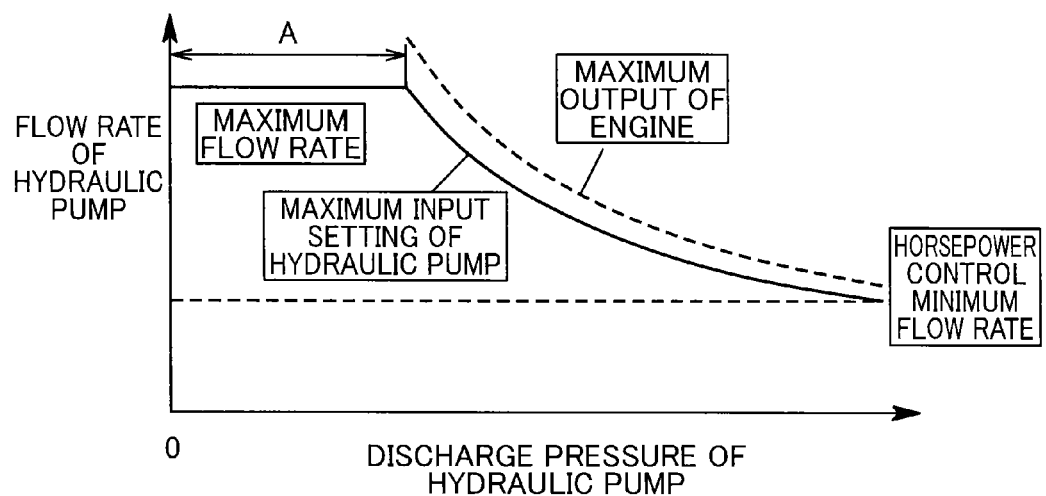
FIG. 3 is a graph showing a relationship between a discharge pressure of a hydraulic pump and a flow rate of the hydraulic pump, in a normal shovel.
Figure 4:
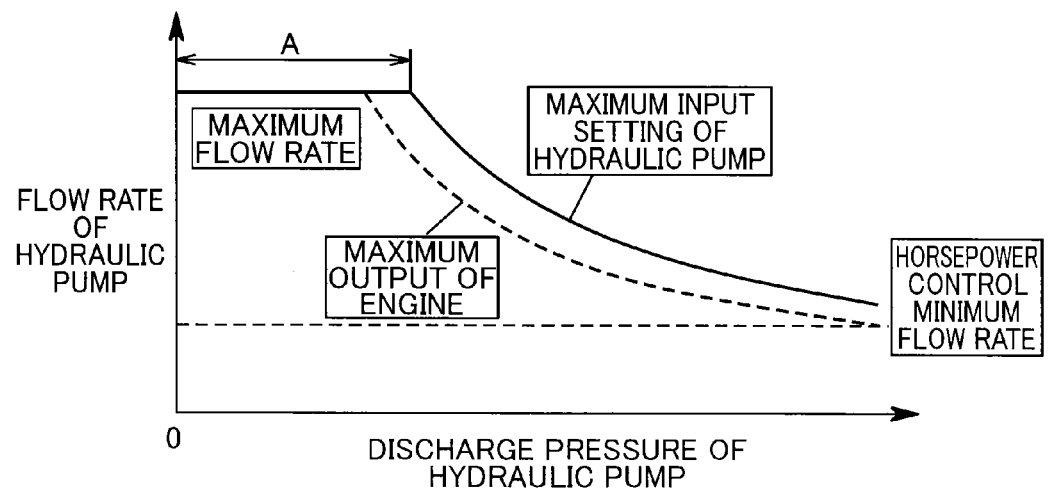
FIG. 4 is a graph showing a relationship between a discharge pressure of a hydraulic pump and a flow rate of the hydraulic pump, in a conventional hybrid shovel.

An embodiment relating to the present invention is described here with reference to FIG. 1 and FIG. 2. In this embodiment, the invention is applied to a hybrid shovel.

FIG. 1 is a block diagram showing a general system composition. The hybrid shovel relating to the present embodiment includes: a hydraulic actuator, a hydraulic pump 3 which drives the hydraulic actuator, a generator-motor 2 capable of operating as an electric generator and an electric motor, an engine 1 to which the hydraulic pump 3 and the generator-motor 2 are connected, an electric storage device 9 which is charged with electric power in order to assist driving of the hydraulic pump 3, an inverter 8 which controls the electric storage device 9 and the generator-motor 2, a pump pressure sensor (pump pressure detector) 11 which determines a discharge pressure of the hydraulic pump 3, a regulator 5 capable of adjusting a discharge amount of the hydraulic pump 3, a control valve 6 which controls supply of hydraulic oil to the hydraulic actuator and discharging of hydraulic oil from the hydraulic actuator, a remote control valve 7 which generates pilot pressure for operating the control valve 6, a pilot pressure sensor 10 which detects a pilot pressure generated by the remote control valve 7, and a controller 4 which controls the inverter 8 and the regulator 5.

The hybrid shovel may employ a so-called parallel system or a series system as a system for supplying power to the hydraulic pump 3. The present invention can be applied to either of these systems.

The hydraulic pump 3 is a pump of a variable-capacity type. More specifically, the tilting of the hydraulic pump 3 is changed by controlling the regulator 5 by the controller 4. Consequently, the discharge amount (flow rate) of the hydraulic pump 3 changes. Hydraulic oil from the hydraulic pump 3 is supplied to a plurality of hydraulic actuators via the control valve 6. The hydraulic actuators include, for instance, a boom cylinder, an arm cylinder, a bucket cylinder and a hydraulic motor for travel, which are provided in the shovel.

The regulator 5 may be one which is operated directly by an electrical signal from the controller 4. Furthermore, the regulator 5 may be one which is operated on the basis of hydraulic pressure from an electromagnetic valve operated by a signal from the controller 4.

The remote control valve 7 generates a pilot pressure in accordance with the amount of operation of the remote control valve 7 (lever operation amount). The control valve 6 operates in accordance with the pilot pressure from the remote control valve 7. The control valve 6 controls supply of hydraulic oil to the hydraulic actuator and discharging of hydraulic oil from the hydraulic actuator (the direction of operation and speed of the hydraulic actuator), in accordance with this operational state of the control valve 6.

The generator-motor 2 is connected to the electric storage device 9 via the inverter 8.

The inverter 8 controls switching of the generator-motor 2 between operation as an electric generator and operation as an electric motor. Furthermore, the inverter 8 controls the current applied to the generator-motor 2 or the torque of the generator-motor 2. Moreover, the inverter 8 controls charging and discharging of the electric storage device 9 in accordance with the operational state of the generator-motor 2.

The electric storage device 9 can be charged by the generator-motor 2 operating as an electric generator. Furthermore, the electric storage device 9 can supply the charged power to the generator-motor 2. Consequently, the generator-motor 2 operates as an electric motor and the driving of the hydraulic pump 3 is assisted.

The pilot pressure sensor 10 detects the pilot pressure (lever operation amount) of the remote control valve 7 in order to control the flow rate in accordance with the lever operation amount. The flow rate control is a control system for controlling the flow rate of the hydraulic pump 3 in accordance with the lever operation amount (the magnitude of the pilot pressure produced by the remote control valve 7) for operating the hydraulic actuator.

The pump pressure sensor 11 detects the discharge pressure of the hydraulic pump 3 as a load pressure of the hydraulic pump 3.

The controller 4 calculates a flow rate of the hydraulic pump 3 based on flow rate control and horsepower control, on the basis of the lever operation amount and the discharge pressure of the hydraulic pump 3, as detected by the sensors 10, 11. More specifically, the controller 4 selects the lower flow rate, of the flow rate of the hydraulic pump 3 as determined by flow rate control and the flow rate of the hydraulic pump 3 as determined by horsepower control. The controller 4 controls the regulator 5 so as to obtain the determined flow rate of the hydraulic pump 3.

In the power source apparatus relating to the present embodiment, the maximum input setting for the hydraulic pump 3 in horsepower control is set as shown in FIG. 2. More specifically, the maximum input setting for the hydraulic pump 3 is defined by the discharge pressure of the hydraulic pump 3 and the flow rate of the hydraulic pump 3. The maximum input setting of the hydraulic pump 3 is determined so as to become greater than the maximum output of the engine when the discharge pressure of the hydraulic pump 3 is the discharge pressure Pp1 (reference pressure), to gradually become smaller as the discharge pressure changes from the discharge pressure Pp1 towards the high-pressure side, and to become smaller than the maximum output of the engine when the discharge pressure is a maximum pressure (relief pressure). The "maximum input of the hydraulic pump" is obtained by multiplying the discharge pressure of the hydraulic pump 3 by the flow rate (note that the efficiency and the coefficient are omitted here).

More specifically, the following relationship is established at the discharge pressure Pp1 which is the maximum flow rate point based on horsepower control.

$$\text{Maximum output of engine} < \text{Maximum input of hydraulic pump}$$

The discharge pressure Pp1 is the pressure which has been set previously as the maximum discharge pressure which makes it possible to set a maximum flow rate.

On the other hand, at the maximum discharge pressure Pp3 (relief pressure) which is the minimum flow rate point based on horsepower control, then the relationship described above is reversed as shown in the following expression.

$$\text{Maximum output of engine} > \text{Maximum input of hydraulic pump}$$

Characteristics by which the maximum input setting of the hydraulic pump 3 changes smoothly in the intermediate region between the discharge pressure Pp1 and the discharge pressure Pp3 are previously set and stored in the controller 4. Furthermore, the controller 4 determines the flow rate for the hydraulic pump 3 on the basis of these characteristics and the discharge pressure detected by the pump pressure sensor 11, and controls the flow rate of the hydraulic pump 3 via the regulator 5 so as to achieve this flow rate.

The discharge pressure (reversal pressure) Pp2 in FIG. 2 is the pressure of the hydraulic pump 3 that represents the reversal boundary point. In other words, the following relationship is established at the discharge pressure Pp2.

$$\text{Maximum output of engine} = \text{Maximum input of hydraulic pump}$$

In other words, the maximum input setting for the hydraulic pump 3 shown in FIG. 2 is greater than the maximum output of the engine 1 throughout the whole pressure range from the discharge pressure Pp1 to the discharge pressure Pp2, and is smaller than the maximum output of the engine 1 throughout the whole pressure range from the discharge pressure Pp2 to the maximum pressure.

By determining the maximum input setting of the hydraulic pump 3 in this way, during continuous operation under high-load pressure conditions (Pp2 to Pp3), it is possible to bear most of the maximum input of the hydraulic pump 3 by the output of the engine 1, and therefore wear of the electric storage device 9 can be suppressed. Consequently, the assistance capability is preserved during continuous operation under the high-load pressure conditions (Pp2 to Pp3) and a sufficient assistance capability can be displayed during subsequent normal work. Continuous operation under high-load conditions means operation of the hydraulic pump 3 continuously at full power, as in a warm-up operation immediately after starting the engine in cold conditions, or when performing rock excavation work.

Consequently, since the hybrid system operates efficiently at all times during normal work, it is possible to enhance energy saving effects. On the other hand, during continuous operation under high-load pressure conditions, it is possible to avoid high-level charging and discharging, such as sudden discharge and subsequent charging of the electric storage device 9, and therefore deterioration of the electric storage device 9 can be suppressed.

Moreover, during operation under high-load pressure conditions, there is an inherent requirement for force (pressure), but little requirement for speed (flow rate). Consequently, there is little disadvantage caused by setting the maximum input setting of the hydraulic pump 3 to be smaller than the maximum output of the engine 1, at a discharge pressure of Pp3. Furthermore, since the flow rate is decreased gradually, no sense of incongruity is produced during operation.

From the points described above, the invention is especially advantageous in small-scale machinery in which, in the overwhelming majority of cases, there is medium-load to low-load work as normal working and there is little heavy-load work.

In the present embodiment, the flow rate is determined by using the previously set flow rate characteristics which are shown in FIG. 2. Consequently, it is possible to simplify the processing performed by the controller 4, compared to a case where the flow rate is calculated by using a pressure detected by the pump pressure sensor 11.

Incidentally, the present invention is not limited to a shovel; for example, it can be applied broadly to other hybrid construction machines, such as a dismantling machine or a breaker which incorporates a shovel as a parent body.

The concrete embodiment described above principally includes an invention having the following composition.

The present invention provides a power source apparatus for a hydraulic actuator, including: a hydraulic pump which drives the hydraulic actuator; a generator-motor capable of operating as an electric generator and an electric motor; an engine to which the hydraulic pump and the generator-motor are connected; an electric storage device which is charged by operation of the generator-motor as an electric generator, and which is capable of supplying charged electric power to the generator-motor in order to cause the generator-motor to operate as an electric motor so as to assist driving of the hydraulic pump; a pump pressure detector which detects a discharge pressure of the hydraulic pump as a load pressure of the hydraulic pump; and a controller which implements horsepower control for determining a flow rate for the hydraulic pump on the basis of flow rate-pressure characteristics that define a maximum input setting for the hydraulic pump by the discharge pressure of the hydraulic pump and the flow rate of the hydraulic pump, and the discharge pressure detected by the pump pressure detector, wherein the flow rate-pressure characteristics are set in such a manner that the maximum input setting for the hydraulic pump is greater than the maximum output of the engine when the discharge pressure is at a predetermined reference pressure, gradually becomes smaller as the discharge pressure changes from the reference pressure towards higher pressure, and becomes smaller than the maximum output of the engine when the discharge pressure is at maximum pressure.

In the present invention, the flow rate is determined on the basis of flow rate-pressure characteristics which define a maximum input setting for the hydraulic pump by the discharge pressure and the flow rate, and the discharge pressure which is detected by the pump pressure detector. Here, in the flow rate-pressure characteristics described above, the maximum input setting for the hydraulic pump is set in such a manner that the maximum input setting for the hydraulic pump is greater than the maximum output of the engine when the discharge pressure is at a reference pressure, gradually becomes smaller as the discharge pressure changes from the reference pressure towards higher pressure, and becomes smaller than the maximum output of the engine when the discharge pressure is at maximum pressure.

Consequently, during continuous operation under high-load pressure conditions, it is possible to bear most of the maximum input of the hydraulic pump by the output of the engine, and therefore wear of the electric storage device can be suppressed. Accordingly, the assistance capability is preserved during continuous operation under high-load pressure conditions and a sufficient assistance capability can be exerted during subsequent normal work. Continuous operation under high-load conditions means operation of the hydraulic pump continuously at full power, as in a warm-up operation immediately after starting an engine in cold conditions, or when performing rock excavation work.

More specifically, since the hybrid system operates efficiently at all times during normal working at medium load or low load, it is possible to enhance energy saving effects. On the other hand, since frequent high-level charging and discharging of the electric storage device can be avoided during continuous operation under high-load pressure conditions, then deterioration of the electric storage device can be suppressed.

Moreover, during operation under high-load pressure conditions, there is an inherent requirement for force (pressure), but little requirement for speed (flow rate). Consequently, there is little disadvantage caused by setting the maximum input setting of the hydraulic pump to be smaller than the maximum output of the engine, when the discharge pressure is a maximum pressure. Furthermore, since the flow rate is decreased gradually, no sense of incongruity is produced during operation.

From the points described above, the invention is especially advantageous in small-scale machinery which carries out medium-load to low-load work as normal working (work with a hydraulic pump at a pressure in the low to intermediate pressure region).

In the power source apparatus, desirably, the controller previously stores the flow rate-pressure characteristics in which the flow rate decreases continuously as the discharge pressure changes from the reference pressure towards the maximum pressure.

In the aspect, the flow rate is determined by using predetermined flow rate-pressure characteristics. Consequently, it is possible to simplify the processing performed by the controller, compared to a case where the flow rate is calculated by using a pressure detected by the pump pressure detector.

In the power source apparatus, desirably, in the flow rate-pressure characteristics, the maximum input setting of the hydraulic pump is greater than the maximum output of the engine in a whole pressure range from the reference pressure to a predetermined reversal pressure, and is smaller than the maximum output of the engine in a whole pressure range from the reversal pressure to the maximum pressure.

According to the aspect, it is possible to reliably suppress wear of the electric storage device in the case of high-pressure work where the discharge pressure is higher than the reversal pressure, while making efficient use of assistance by the electric storage device when the discharge pressure is lower than the reversal pressure.

More specifically, the reference pressure can be set previously as the maximum discharge pressure at which the flow rate can be set to a maximum flow rate.

Furthermore, the present invention provides a hybrid construction machine which includes a hydraulic actuator, and the power source apparatus which supplies power to the hydraulic actuator.

INDUSTRIAL APPLICABILITY

According to the present invention, it is possible to suppress wear of a electric storage device during continuous operation of a hydraulic pump under high-load pressure conditions, and to ensure assistance capability during subsequent normal work.

EXPLANATION OF REFERENCE NUMERALS $Pp1$ discharge pressure (reference pressure)
$Pp2$ discharge pressure (reversal pressure)
$Pp3$ discharge pressure (maximum pressure)
1 engine
2 generator-motor
3 hydraulic pump
4 controller
9 electric storage device
11 pump pressure sensor (pump pressure detector)

The invention claimed is:

1. A power source apparatus for a hydraulic actuator, comprising:
   a hydraulic pump which drives the hydraulic actuator;
   a generator-motor capable of operating as an electric generator and an electric motor;
   an engine to which the hydraulic pump and the generator-motor are connected;
   an electric storage device which is charged by operation of the generator-motor as an electric generator, and which is capable of supplying charged electric power to the generator-motor in order to cause the generator-motor to operate as an electric motor so as to assist driving of the hydraulic pump;
   a pump pressure detector which detects a discharge pressure of the hydraulic pump as a load pressure of the hydraulic pump; and
   a controller which implements horsepower control for determining a flow rate for the hydraulic pump on the basis of flow rate-pressure characteristics that define a maximum input setting for the hydraulic pump by the discharge pressure of the hydraulic pump and the flow rate of the hydraulic pump, and the discharge pressure detected by the pump pressure detector,
   wherein the flow rate-pressure characteristics are set in such a manner that the maximum input setting for the hydraulic pump is greater than the maximum output of the engine by a predetermined flow-rate difference when the discharge pressure is at a predetermined reference pressure, wherein the predetermined flow-rate difference gradually becomes smaller as the discharge pressure changes from the reference pressure towards higher pressure, and wherein the maximum input setting for the hydraulic pump becomes smaller than the maximum output of the engine when the discharge pressure is at maximum pressure.

2. The power source apparatus according to claim 1, wherein the controller previously stores the flow rate-pressure characteristics in which the flow rate decreases continuously as the discharge pressure changes from the reference pressure towards the maximum pressure.

3. The power source apparatus according to claim 1, wherein, in the flow rate-pressure characteristics, the maximum input setting of the hydraulic pump is greater than the maximum output of the engine in a whole pressure range from the reference pressure to a predetermined reversal pressure, and is smaller than the maximum output of the engine in a whole pressure range from the reversal pressure to the maximum pressure.

4. The power source apparatus according to claim 1, wherein the reference pressure is a pressure which is predetermined as a maximum discharge pressure at which the flow rate can be set to a maximum flow rate.

5. A hybrid construction machine, comprising:
   a hydraulic actuator; and
   the power source apparatus according to claim 1, which supplies power to the hydraulic actuator.

* * * * *